United States Patent
Mitra et al.

(10) Patent No.: US 11,424,435 B2
(45) Date of Patent: Aug. 23, 2022

(54) HIGH OXIDATION STATE PERIODATE BATTERY

(71) Applicant: New Jersey Institute of Technology, Newark, NJ (US)

(72) Inventors: Somenath Mitra, Bridgewater, NJ (US); Zhiqian Wang, East Newark, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 30 days.

(21) Appl. No.: 16/870,081

(22) Filed: May 8, 2020

(65) Prior Publication Data

US 2020/0358074 A1 Nov. 12, 2020

Related U.S. Application Data

(60) Provisional application No. 62/845,419, filed on May 9, 2019.

(51) Int. Cl.
*H01M 4/00* (2006.01)
*H01M 4/04* (2006.01)
(Continued)

(52) U.S. Cl.
CPC ......... *H01M 4/0442* (2013.01); *H01M 4/485* (2013.01); *H01M 4/602* (2013.01); *H01M 4/621* (2013.01)

(58) Field of Classification Search
CPC ...... H01M 4/134; H01M 4/131; H01M 4/602; H01M 4/0442; H01M 4/485; Y02E 60/10
See application file for complete search history.

(56) References Cited

U.S. PATENT DOCUMENTS 4,060,676 A * 11/1977 Dey .................. H01M 4/06
429/217
4,470,939 A * 9/1984 Schoolcraft ........... H01M 4/043
264/105
(Continued)

FOREIGN PATENT DOCUMENTS

| DE | 2755797 A1 | 7/1979 |
| WO | 2014136813 A1 | 9/2014 |
| WO | 2019012012 A1 | 1/2019 |

OTHER PUBLICATIONS

Nyström G, Marais A, Karabulut E, Wågberg L, Cui Y, Hamedi MM. Self-assembled three-dimensional and compressible interdigitated thin-film supercapacitors and batteries. Nature communications. May 29, 2015;6:7259.

(Continued)

*Primary Examiner* — Cynthia H Kelly
*Assistant Examiner* — Monique M Wills
(74) *Attorney, Agent, or Firm* — Lerner, David, Littenberg, Krumholz & Mentlik, LLP

(57) ABSTRACT

The development of a novel battery comprising of high-oxidation-state periodate complex cathode and zinc anode is disclosed. A periodate complex $H_7Fe_4(IO_4)_3O_8$ was prepared by a precipitation reaction between $Fe(NO_3)_3$ and $NaIO_4$, and was used in battery development for the first time. $NaMnIO_6$ double periodate salts were also synthesized from $MnSO_4$ and $NaIO_4$ using the same techniques. The $H_7Fe_4(IO_4)_3O_8$ alone showed specific capacity of 300 mAh $g^{-1}$; while $NaMnIO_6$ showed specific capacity as high as 750 mAh $g^{-1}$. Compared to single-electron processes in conventional cathode reactions, the possibility to significantly enhance cathode specific capacity via a multi-electron process associated with valence change from I(VII) to $I_2$ is demonstrated. Novel 3D-printed reserve battery casing designs comprising replaceable electrodes also disclosed.

(Continued)

Batteries featuring an ion-exchange membrane dual-electrolyte design are disclosed. Periodate based dry cell batteries utilizing polymer electrolytes are also disclosed.

19 Claims, 14 Drawing Sheets

(51) Int. Cl.
*H01M 4/62* (2006.01)
*H01M 4/60* (2006.01)
*H01M 4/485* (2010.01)

(56) References Cited

U.S. PATENT DOCUMENTS

| | | | |
|---|---|---|---|
| 2008/0261094 A1* | 10/2008 | Licht | H01M 8/00 429/403 |
| 2010/0121166 A1 | 5/2010 | Heller et al. | |
| 2013/0004836 A1* | 1/2013 | Otsuka | H01G 11/30 429/188 |
| 2015/0014581 A1* | 1/2015 | Kawakami | H01M 4/525 252/182.1 |
| 2016/0190547 A1 | 6/2016 | Schweiss | |
| 2016/0261005 A1* | 9/2016 | Rustomji | C25D 3/44 |
| 2017/0025646 A1* | 1/2017 | Ota | H01M 10/0413 |
| 2017/0229730 A1* | 8/2017 | Flitsch | H01M 4/622 |
| 2019/0348705 A1* | 11/2019 | Chen | H01M 10/0562 |

OTHER PUBLICATIONS

Wang Z, Meng X, Chen K, Mitra S. Synthesis of carbon nanotube incorporated metal oxides for the fabrication of printable, flexible nickel-zinc batteries. Advanced materials interfaces. Feb. 2018;5(4):1701036.

* cited by examiner

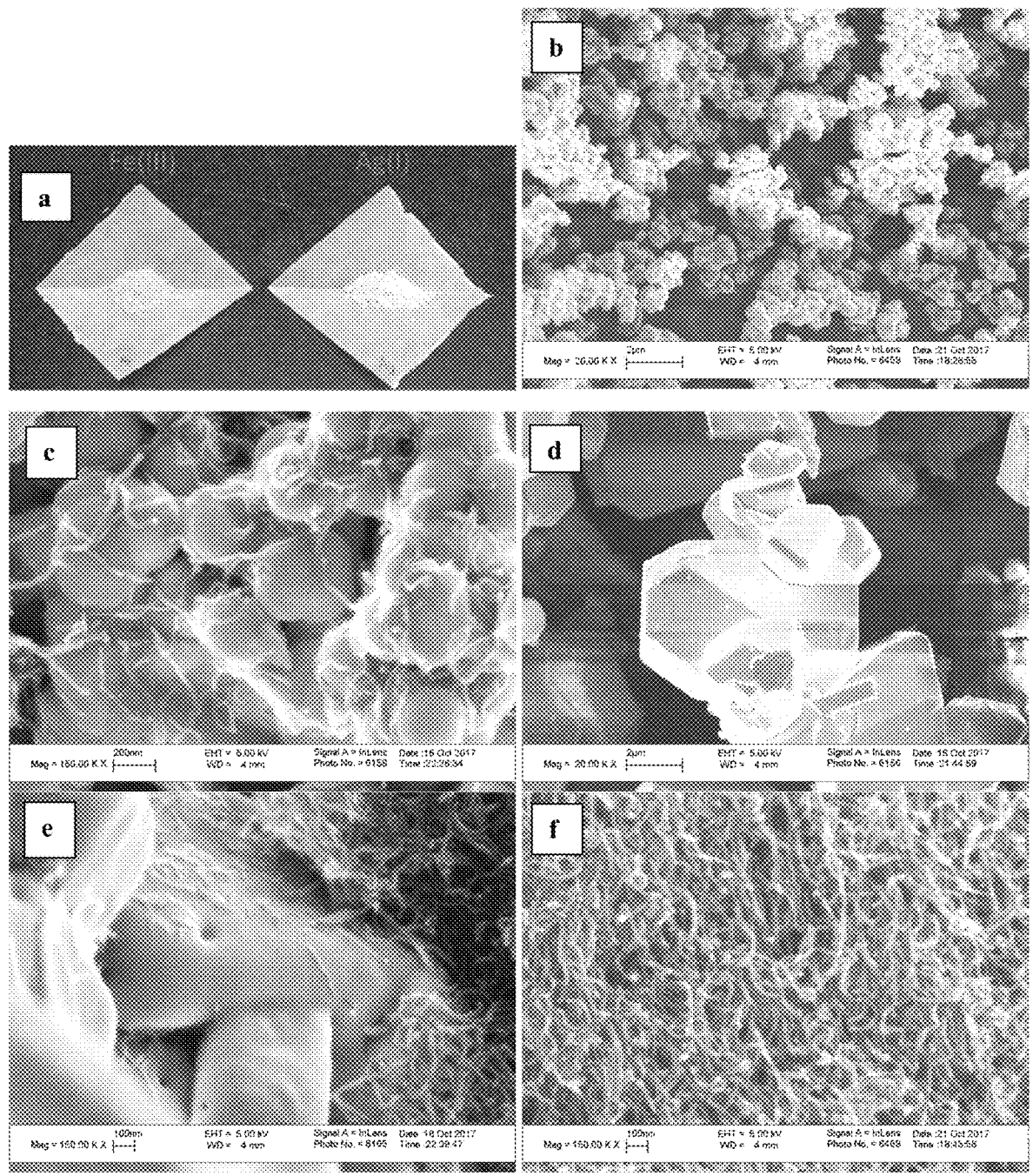
FIGs. 1(a-f).

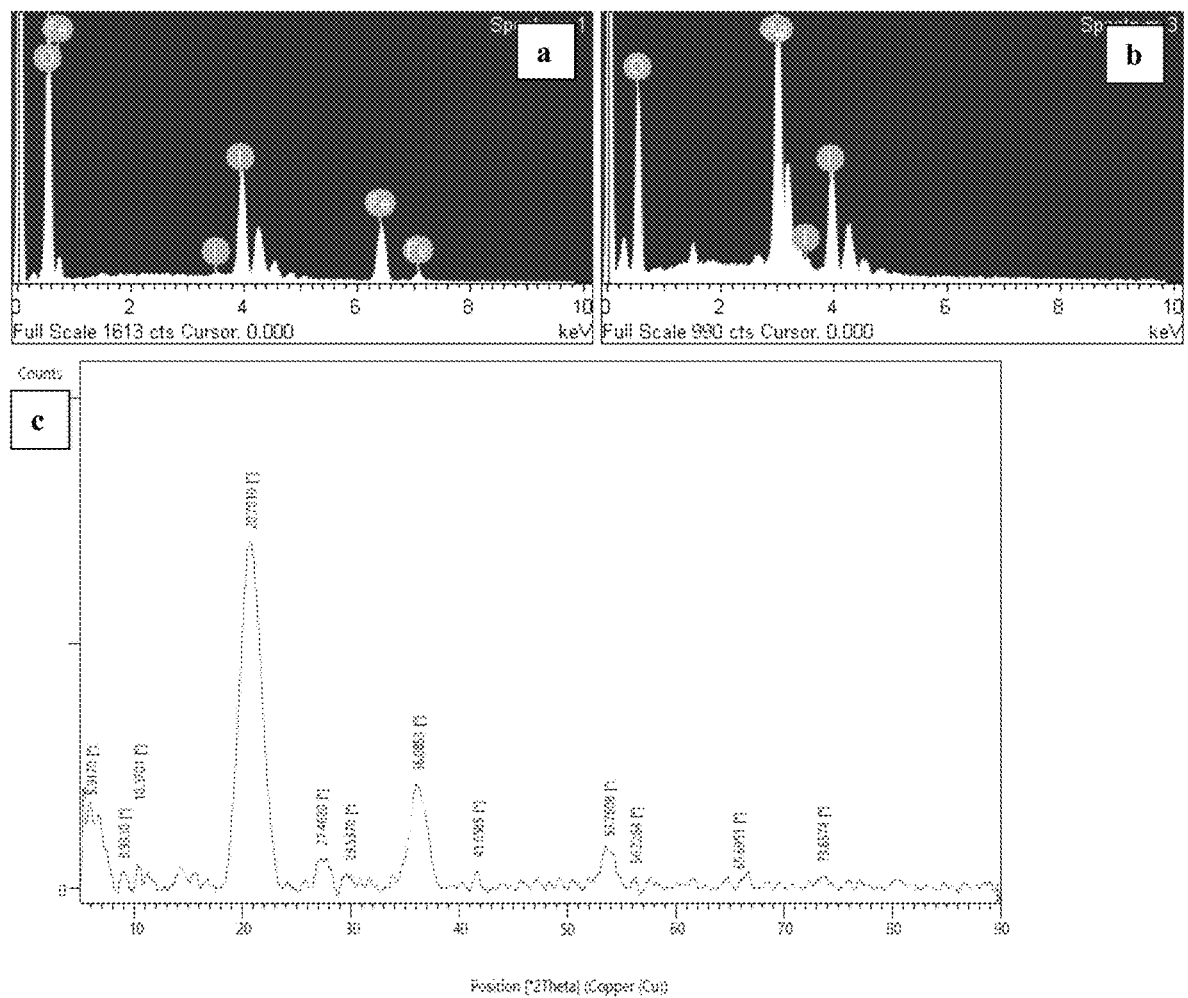
FIGs. 2(a-c).

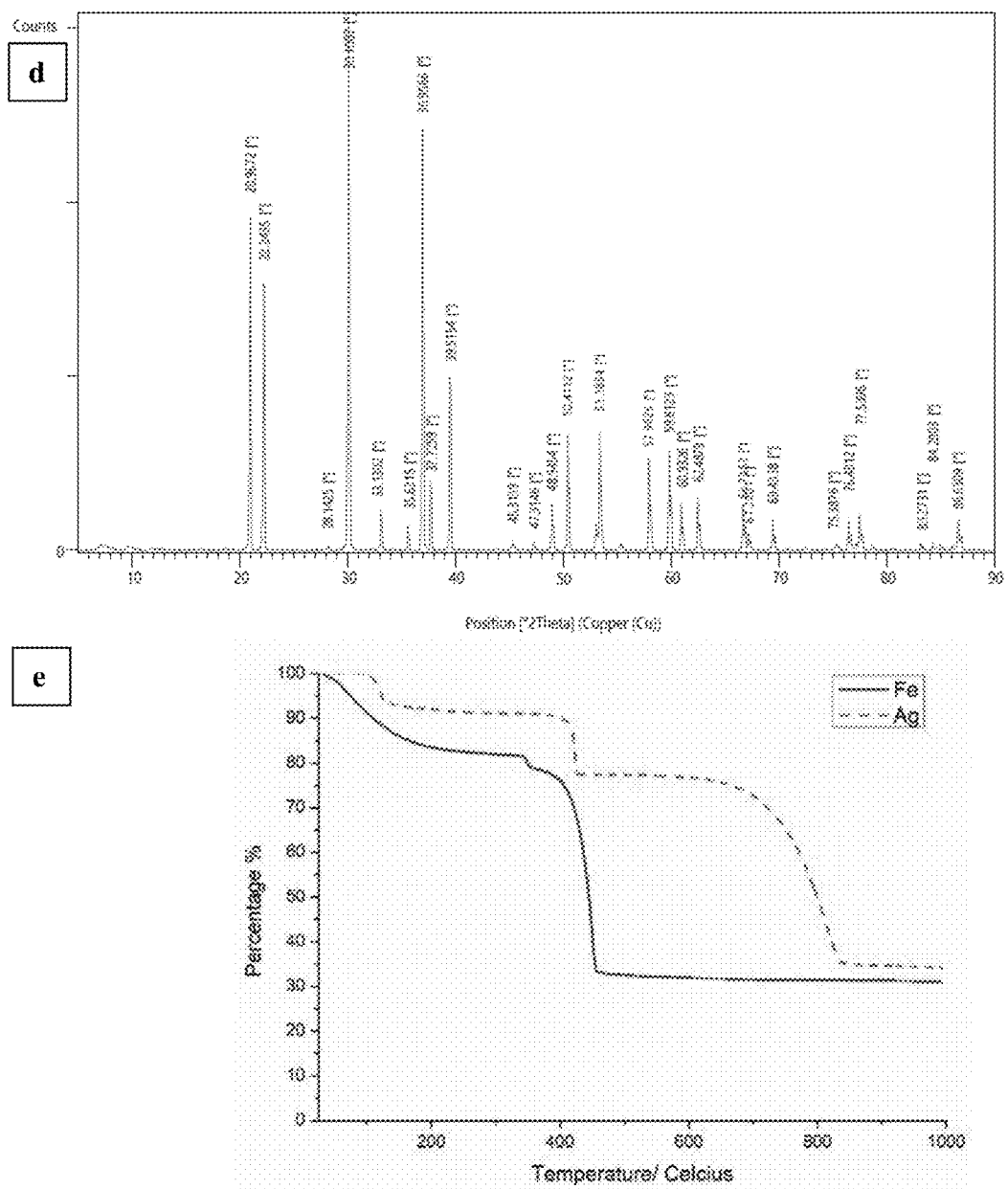
FIGs. 2(d-e).

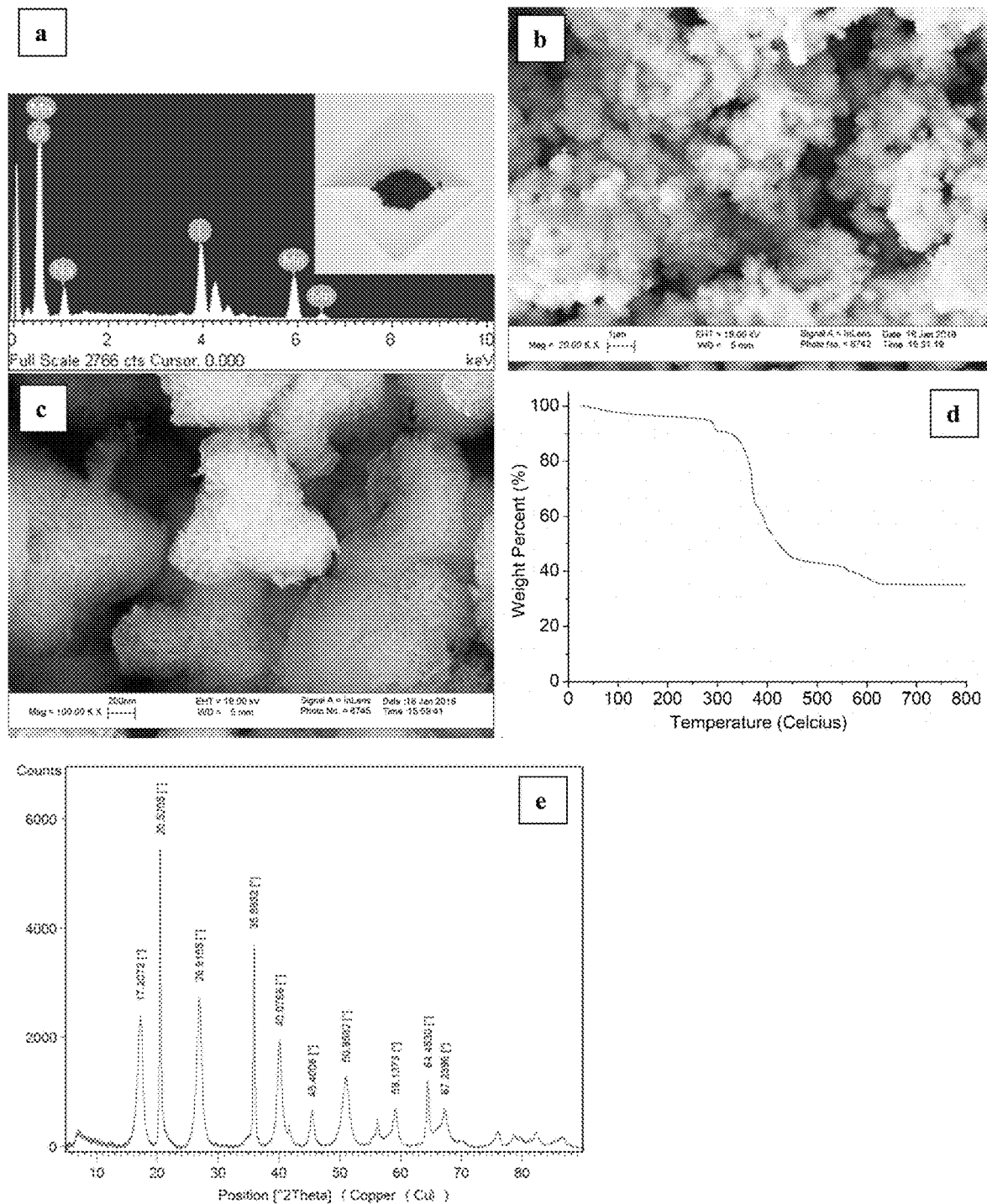
FIGs. 3(a-e).

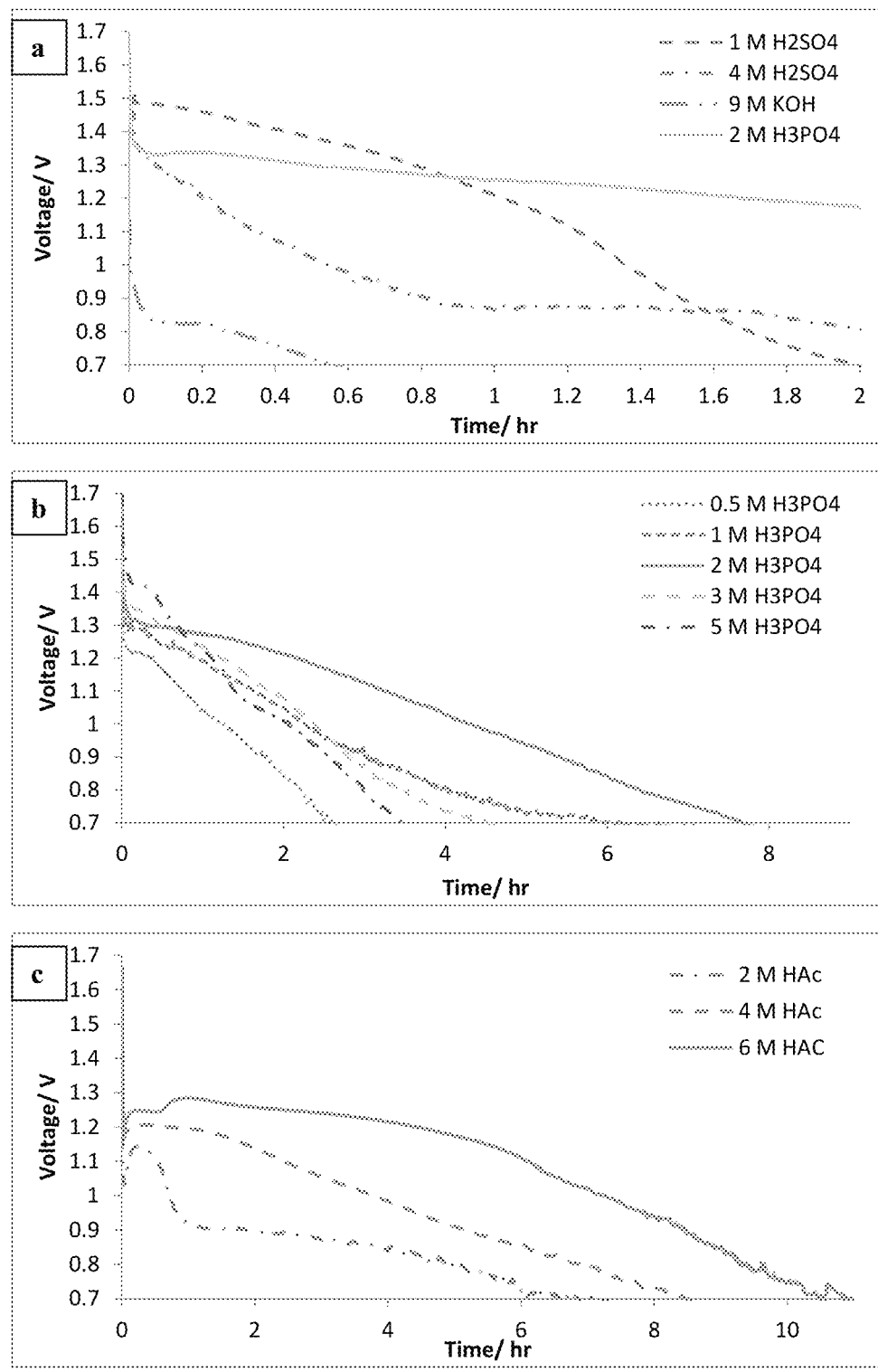
FIGs. 4(a-c).

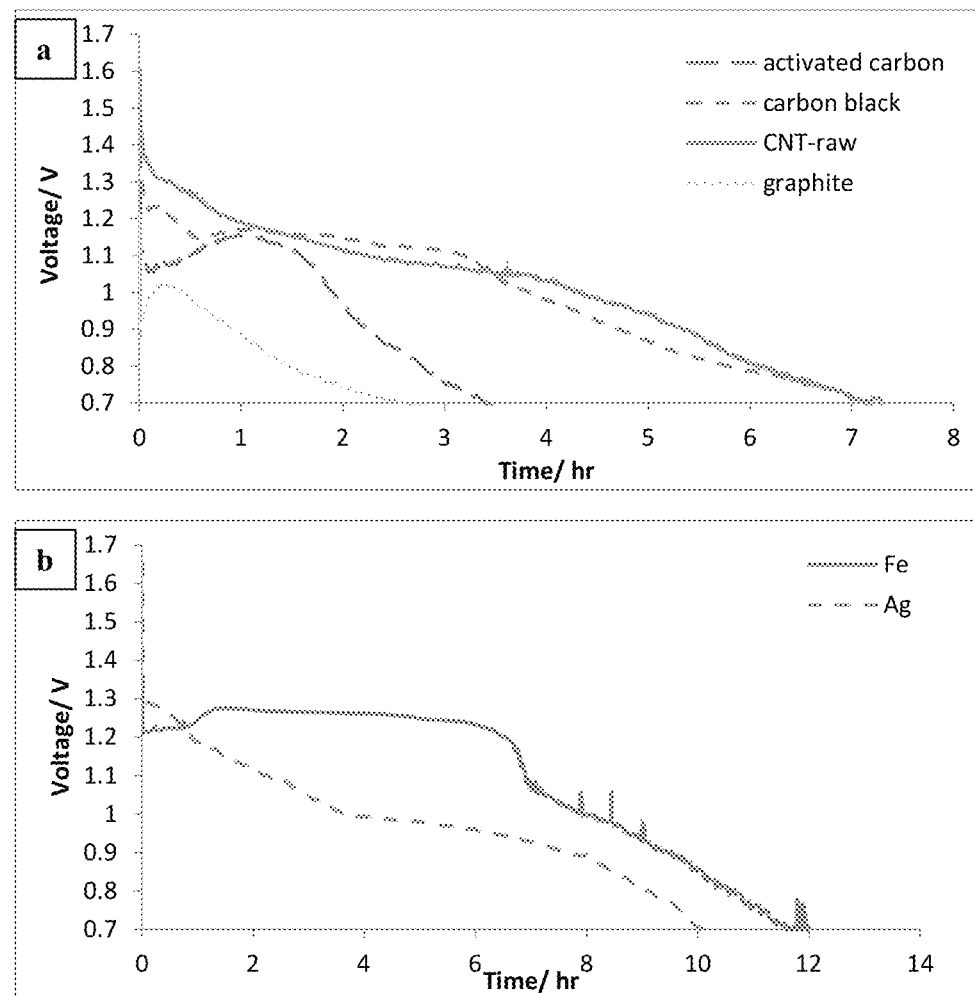
FIGs. 5(a-b).

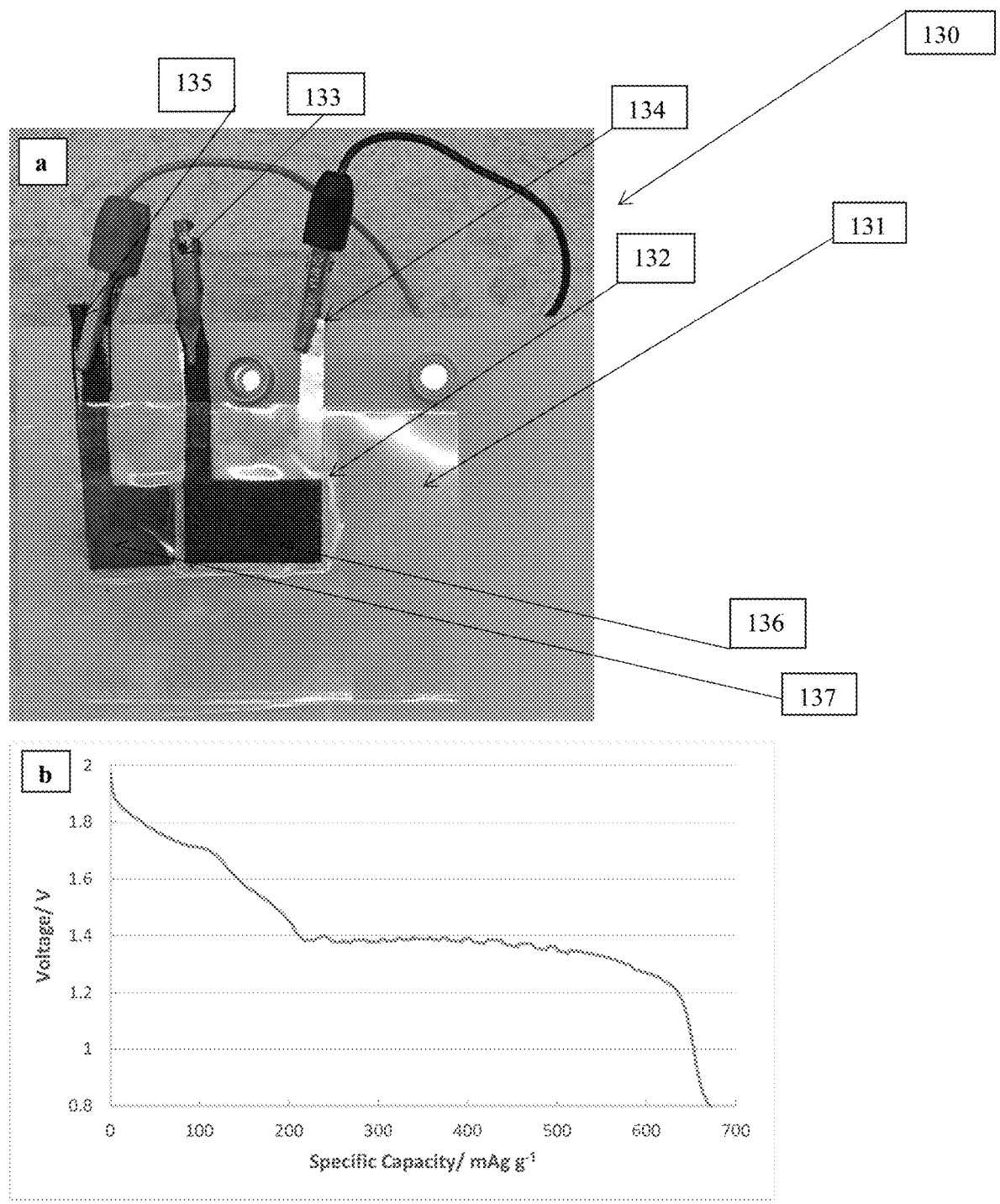
FIGs. 13(a-b).

Table 1. Performance of 3D-printed $H_7Fe_4(IO_4)_3O_8$-Zn reserve battery.

| Discharge Rate [mA] | Specific Discharge Rate [mA g$^{-1}$] | Specific Capacity [mAh g$^{-1}$ periodate] |
|---|---|---|
| 0.31 | 20 | 280.52 |
| 0.62 | 40 | 291.03 |
| 1.24 | 80 | 327.03 |

FIG. 14(a)

Table 2. Rate properties of $NaMnIO_6$ batteries using various metal anodes.

| | Rate | 0.4C | 0.1C | 0.05C |
|---|---|---|---|---|
| Zn Cells | Specific Capacity [based on NaMnIO$_6$, mAh g$^{-1}$] | 755 | 745 | 731 |
| | Specific Energy [based on electrode active materials, Wh kg$^{-1}$] | 301 | 343 | 336 |
| Al Cells | Specific Capacity [based on NaMnIO$_6$, mAh g$^{-1}$] | 627 | 689 | 704 |
| | Specific Energy [based on electrode active materials, Wh kg$^{-1}$] | 397 | 505 | 558 |
| Mg Cells | Specific Capacity [based on NaMnIO$_6$, mAh g$^{-1}$] | 733 | 753 | 732 |
| | Specific Energy [based on electrode active materials, Wh kg$^{-1}$] | 666 | 744 | 733 |

FIG. 14(b)

HIGH OXIDATION STATE PERIODATE BATTERY

CROSS REFERENCE TO RELATED APPLICATION

This application claims priority from U.S. provisional application No. 62/845,419 filed on May 9, 2019, the disclosure of which is hereby incorporated herein by reference.

FIELD OF USE

The present disclosure relates to a high-oxidation-state-material battery, wherein a high-oxidation-state-material is defined as a material which contains one or more elements with oxidization states of five or higher. In particular, the present disclosure relates to a high capacity periodate battery.

BACKGROUND OF THE INVENTION

With the proliferation of smart electronics and the increased miniaturization of these devices, alternative methods for battery construction are becoming more important. Traditional size conventional batteries like AA and AAA cell batteries have cathode capacities of around 300 milliampere hours per gram (mAh g$^{-1}$), which is a measure of how long a battery will hold a charge. Material used in conventional batteries is typically zinc and manganese dioxides that deliver few electrons per molecule.

Li-based batteries have been the mainstay battery technology for smart and consumer electronics industries due to their high capacities, energy densities and cycle life performance. However, in recent times new methods to improve performance and safety of Li-ion batteries are constantly being pursued due to many drawbacks of these Li-based batteries.

Changes to electrode materials can improve battery performance. For wearable, flexible, stretchable or small electronics applications, the batteries compose a large and bulky part of the overall volume. These designs however still rely upon the organic based electrolytes which are moisture sensitive and require anhydrous processing in their preparation. They are often limited in energy density (volumetric) as the flexibility typically arises from a very thin construction.

Aqueous based batteries do not require the use of costly and highly flammable organic electrolytes which must be monitored and controlled to limit thermal runaway. As with organic Li-ion batteries, aqueous based cells can be adapted and used with a variety of electrode materials and morphologies. The cell voltages for aqueous based batteries are less than that of their organic counterparts, however, the benefits to safety and processing costs are driving future developments. Aqueous batteries can also be used to form flexible fiber electrodes which demonstrate high safety tolerances and stretching capabilities. Most common aqueous batteries include zinc-carbon, alkaline manganese dioxide-zinc, Ag—Zn, Ni-MH, Ni—Zn, lead-acid, zinc-air batteries. The recent development of aqueous Li-ion batteries, those which utilize a water based electrolyte and pre-lithiated electrodes, eliminates the need for high cost anhydrous processing methods.

Current Li-ion technologies in any format, whether high capacity and high power, of limited capacity and long cycle life and variations of these, are not made with the end product design in mind. For remote wireless high density network products and body shape-conforming wearable technology or medical devices, current batteries cannot provide an effective solution because of their size and weight. Currently available lithium batteries have the desired low weight and high energy densities but they have safety issues like overheating, burning and even explosion. The lithium-ion battery cathodes also have low specific capacities, mostly lower than 200 mAh g$^{-1}$. They are mostly employed in power hungry devices such as mobile phones that require regular recharging. Existing battery design is restricted by the shape and the size of the device that it is powering.

Materials with high energy density, electrode potential, specific capacity, as well as low solubility in electrolytes and low self-discharge rate have been of great interest to the battery industry, however, have been met with limited success. Most conventional batteries, especially aqueous ones such as $MnO_2$—Zn, Ni—Cd, Ni-MH and Ag—Zn, are based on single-electron cathode processes. This makes the cathode specific capacity lower than the anode, especially when metal anodes are used.

There has been much interest in conformal batteries that have different shapes and sizes. For example, flexible batteries have been made into thin-film and cable forms; and microscale 3D-printed batteries have also been fabricated. For 3D-printed lithium-ion batteries and zinc-air cells, these types of battery cells have been fabricated using ink-dispensing systems. Although micro battery electrode structures could be precisely controlled during 3D printing, the electrode fabrication incorporating precise active component formulations poses major challenges. Some of these challenges include, but are not limited to, little variation in structural architecture due to the additive 3D printing process, dwindling supplies and increased cost of necessary metallic material, limited selection or few printable materials to use for battery purposes, and the like. There are many other drawbacks to current state of the art as well.

Thus, there remains a need in the art for a process and material to produce the same or better charge than conventional batteries that allows use of smaller and more powerful batteries, or batteries of the same size as conventional batteries that last longer.

SUMMARY

Compared to the above methods the present disclosure fulfills the above criteria and provides additional benefits that state of the art systems cannot provide.

The current apparatus and method provides a high capacity periodate battery with 3D-printed casing for accommodating replaceable, and flexible electrodes. The novel 3D-printed casing allows the electroactive materials to be replaced for re-use. The iodine chemistry presented herein provides additional improvements. In addition, in accordance with embodiments of the present disclosure, battery systems and methods based on periodate complex cathodes are disclosed. In one embodiment, a prototype periodate reserve battery using 3D-printing technology is disclosed.

In one aspect, a novel battery disclosed herein comprises an iron(III) periodate complex cathode and a zinc anode. The periodate complex [$H_7Fe_4(IO_4)_3O_8$], depending on the embodiment, is prepared by a precipitation reaction between $Fe(NO_3)_3$ and $NaIO_4$. It is the inventors understanding that the material used in battery development discussed herein has never been used before and is being used for the first time in battery applications.

In another aspect, the periodate complex along with 14% carbon nanotubes and a polytetrafluoroethylene coating may form a stable flexible electrode. Depending on the implementation, the battery may show a specific capacity as high as 300 mAhg$^{-1}$ for a particular formulation. Higher specific capacity readings are achievable as well as discussed herein. Compared to single-electron processes in conventional cathode reactions, the possibility to significantly enhancing the cathode specific capacity via a multi-electron process associated with valence change from I(VII) to I$_2$ is demonstrated. A novel three-dimensional printed reserve battery design comprising replaceable electrodes and acetic acid electrolyte is also presented.

The casings are reusable, while the components inside can be replaced when depleted. NaMnIO$_6$ double periodate salts were also synthesized from MnSO$_4$ and NaIO$_4$ using techniques discussed herein.

The H$_7$Fe$_4$(IO$_4$)$_3$O$_8$ alone showed specific capacity of 300 mAhg$^{-1}$; while NaMnIO$_6$ showed specific capacity as high as 750 mAh g$^{-1}$. Compared to single-electron processes in conventional cathode reactions, the possibility to significantly enhance cathode specific capacity via a multi-electron process associated with valence change from I(VII) to I$_2$ is demonstrated. Again, novel 3D-printed reserve battery casing designs comprising replaceable electrodes are also disclosed.

In another aspect, batteries featuring an ion-exchange membrane dual-electrolyte design are disclosed. Periodate based dry cell batteries utilizing polymer electrolytes are also disclosed. In one embodiment, a prototype double salt periodate reserve battery using an acid-salt dual-electrolyte design is disclosed.

Depending on the implementation, a proto-typing approach can be taken for 3D printing of batteries where custom casing and packaging can be printed using conventional polymer filaments. The casings can be reused whereas the electrodes, which can be prepared by conventional methods, can be replaced when consumed. Then the battery can be activated by the addition of the electrolyte(s). This procedure is also applicable to reserve batteries.

In yet another aspect, the periodate batteries can also be fabricated in the form of dry cells, with polymers holding up the electrolytes. The dry cells contain all components and are ready for usage without activation. Design of such dry cells includes, but are not limited to, a pouch, a coin and a button, a cylindrical, and a cuboid battery.

In another aspect of the invention, an inorganic battery comprises a high-oxidation-state material cathode, a reducing anode where the cathode and the anode both form electrodes. One or more electrolytes are used that are a chemical medium that separates the electrodes and allows ion movement between the electrodes. The high oxidation-state-material cathode contains one or more high oxidation state elements with oxidization states of five or higher. Depending on the implementation, the high-oxidation-state-material cathode may be a solid electrode and the one or more high oxidation state elements takes part in a chemical reaction. In other embodiments, the high-oxidation-state-material cathode may be a periodate complex cathode, wherein the periodate complex cathode includes, but is not limited to, an iron(III) periodate complex cathode, a silver periodate complex cathode, a double salt periodate cathode containing a plurality of metals and hydrogen, wherein the plurality of metals take part in an electrochemical process of the battery. The double salt periodate cathode, depending on the embodiment, is a sodium manganese periodate complex cathode. Furthermore, depending on the embodiment, the one or more electrolytes, includes, but is not limited to, an aqueous non-flammable electrolyte, and an ionic liquid non-flammable electrolyte. The battery further includes a battery casing that may be 3D printed using a polymer or a metal filament to form desired conformal shapes and sizes. Depending on the embodiment, the high-oxidation-state-material is selected from a group consisting of an iodate, a periodate, a bromate, a perbromate, a permanganates, a manganate, a chromate, a tungstate, a dichromate, and any combination thereof. In addition, depending on the embodiment, the high-oxidation-state-material has a non-acid ion metal element that is selected from a group consisting of a nickel, a vanadium, a lead, a copper, a cobalt, a bismuth, an antimony, a tin, a titanium, a mercury, a barium, a chromium, and any combination thereof. In one implementation, the high-oxidation-state-material cathode further includes a plurality of conductive carbon nano tubes, and a hydrophilic layer of polymer enhancement. The reducing anode may be an active metal anode. In addition, the battery may further include an ion exchange membrane and dual-electrolyte design for electrolyte separation and pH control. The membrane may be placed in a center of a battery casing to separate the cathode assembly and the anode electrode. In one embodiment, the electrolyte for the cathode is an acidic electrolyte, and the electrolyte for the anode is a salt or a non-acidic electrolyte. In another embodiment, the electrolyte is a gel, or a polymer electrolyte, or an organic mixture. Furthermore, depending on the embodiment, the chemical medium may be a non-liquid and the battery may be a dry cell battery containing no free-flow liquids.

In another aspect, a method of making a high oxidation state periodate battery, comprises (a) dissolving an electrolyte compound in an amount of water to form a homogenous electrolyte solution; (b) mixing a cathode slurry containing a plurality of solid cathode particles including a periodate, a conductive carbon, a binder, and an amount of water; (c) casting the cathode slurry onto an inert current collector, drying the cathode slurry before laminating a polymer containing a hydrophilic fortification layer to form a cathode assembly; (d) designing and printing a 3D battery casing using an inert filament that is physically and chemically stable with the electrolyte solution; (e) inserting and securing the cathode assembly and a metal anode into the 3D-printed casing, wherein the 3D-printed casing is reusable and the cathode assembly and the anode are replaceable when consumed; and (f) activating the battery by injecting the electrolyte solution before capping the battery for sealing.

In yet another aspect, a method of making a high oxidation state periodate battery, comprises (a) dissolving a cathode electrolyte compound and an anode electrolyte compound in water, respectively to form two electrolyte solutions; (b) mixing a cathode slurry containing a plurality of solid cathode particles including a periodate, a conductive carbon, a binder, and an amount of water; (c) casting the cathode slurry onto an inert current collector, drying the cathode slurry before laminating a polymer fortification layer to form a cathode assembly; (d) placing an anion-exchange-membrane in a center of a battery casing to separate the cathode assembly and the anode electrodes, and sealing sides of the battery casing with a sealant to prevent ion by-passing; (e) inserting and securing the cathode assembly and the anode into the battery casing; and (f) activating the battery by injecting the electrolyte solutions before capping the battery casing for sealing.

Any combination and/or permutation of the embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

To assist those of skill in the art in making and using the disclosed battery system and associated systems and methods, reference is made to the accompanying FIGS., wherein:

FIGS. 1(a-f) show (a) photographs of as-prepared silver and iron periodate complexes; Scanning Electron Microscopy (SEM) images of (b) an iron(III) periodate complex; (c) an iron(III) periodate electrode; (d) a silver(I) periodate complex; (e) a silver(I) periodate electrode; and (f) pure carbon nanotubes, in accordance with one embodiment of the present disclosure;

FIGS. 2(a-e) show an energy-dispersive X-ray spectroscopy (EDX) of (a) an iron(III) periodate complex; (b) a silver(I) periodate complex; X-ray diffraction (XRD) of (c) an iron(III) periodate complex; (d) a silver(I) periodate complex; (e) Thermogravimetric Analysis (TGA) of the Ag and Fe periodates;

FIGS. 3(a-e) show (a) an EDX and photographs of as prepared periodate double salt $NaMnIO_6$; (b) and (c) SEM images of periodate double salt $NaMnIO_6$; (d) a TGA analysis of $NaMnIO_6$; (e) a X-ray diffraction (XRD) of $NaMnIO_6$;

FIGS. 4(a-c) show graphs illustrating the effect of an electrolyte on iron(III) periodate complex ($H_7Fe_4(IO_4)_3O_8$) zinc cell performance: (a) strong acids and bases as electrolytes; (b) phosphoric acids as electrolytes; (c) acetic acids as electrolytes;

FIG. 5(a) is a graph illustrating the effect of different carbon materials in $H_7Fe_4(IO_4)_3O_8$—Zn batteries;

FIG. 5(b) is a graph comparing cations: $Fe^{3+}$ periodate vs $Ag^+$ periodate;

FIG. 13(a) demonstrates $NaMnIO_6$—Zn dry cells powering LED light;

FIG. 13(b) shows the discharge curve of a $NaMnIO_6$—Zn dry cell under the rate of 0.05 C;

FIG. 14 (a) illustrates Table 1 that shows performance of 3D-printed $H_7Fe_4(IO_4)_3O_8$—Zn reserve batteries; and FIG. 14(b) illustrates Table 2 that shows rate properties of $NaMnIO_6$ batteries using various metal anodes.

DETAILED DESCRIPTION

Figure 6:
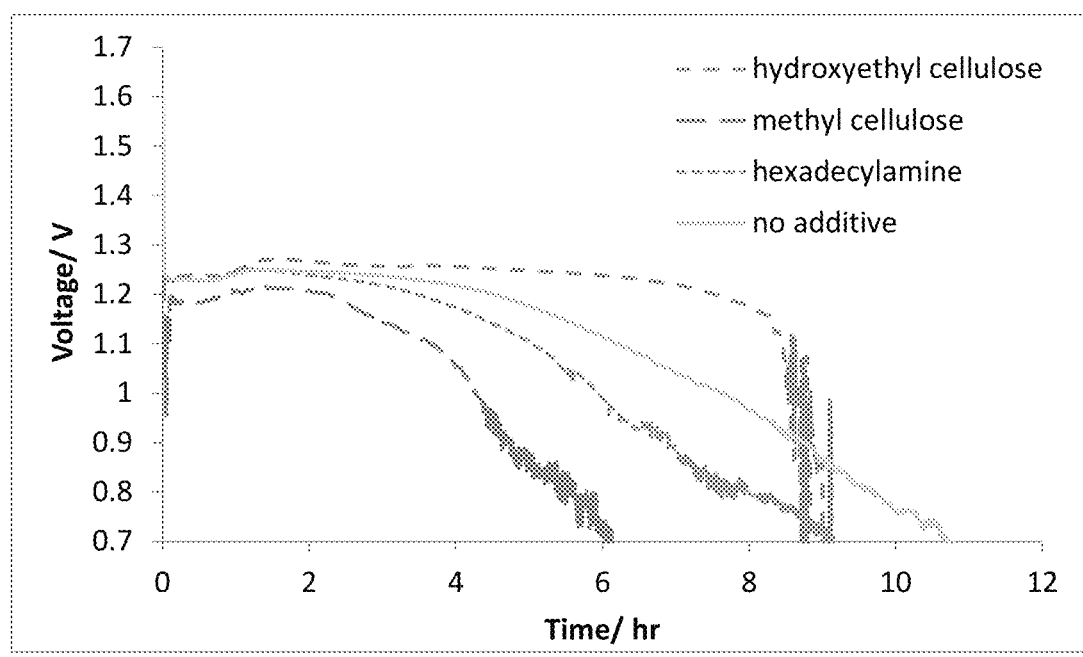
FIG. 6 is a graph illustrating the influence of anode corrosion inhibitors in acetic acid electrolyte.

Periodates ($IO_4^-$) are strong oxidants with the highest possible oxidation state for iodine. Periodic acid and its Na and K salts have been used in organic reactions. The iodine (VII) and iodine(V) compounds show positive electrode potentials, which makes them viable material for electrochemical storage. Yet there have been few reports on periodate based electrodes where Na and K periodate cathodes have shown a two-electron reduction to $IO_3^-$ in an alkaline environment. There are also few reports on $IO_3^-$ based electrodes. A combination of $KIO_3$ cathode and $H_2SO_4$ electrolyte has shown the reduction of $IO_3^-$ to $I_2$. However, the zinc anode reacted with $H_2SO_4$, making it a less effective battery. The oxidizing capability of $IO_4^-$ is pH-dependent and under the right conditions, iodine(VII) is expected to show multi-electron processes and can be reduced beyond iodine(V) to lower oxidation states, thus providing larger capacity. Another reported problem is that alkaline periodates are soluble in neutral and acidic environments, which makes electrode formation difficult. Moreover, periodate and iodates salts are nonconductive and require large amounts of conductive materials, such as graphite and acetylene black, which occupies space and adds to the electrode weight.

Double salt periodates containing multiple metals provide another possibility to further enhance the electrode performance, as in such compounds, not only the acid anion iodine (VII) but also the metal can take part in the electrochemical reaction. A typical requirement is that certain pH is required for such reactions to take place and the salt should remain chemically and physically stable under such conditions.

Exemplary embodiments are directed to a periodate battery. It should be understood that embodiments could generally be applied to other types of batteries.

One embodiment of a battery comprising an iron(III) periodate complex cathode and zinc anode is disclosed. In this embodiment, the periodate complex ($H_7Fe_4(IO_4)_3O_8$) was prepared by a precipitation reaction between $Fe(NO_3)_3$ and $NaIO_4$. It will be understood that the other types of periodate complexes could be employed. For purposes of this description, high oxidation or high-oxidation-state-material is defined as a material which contains one or more elements with oxidization states of five or higher.

Another embodiment of a battery comprising a sodium manganese periodate cathode, a metal anode, and HCl—NaCl dual electrolyes is disclosed. In this embodiment, the periodate $NaMnIO_6$ was prepared by a precipitation reaction between $MnSO_4$ and $NaIO_4$. It will be understood that the other types of a periodate double salt could be employed for an electrolyte, and other salts and acids for an electrolyte.

The materials and the methods of the present disclosure used in one embodiment will be described below. While the embodiment discusses the use of specific compounds and materials, it is understood that the present disclosure could employ other suitable materials. Similar quantities or measurements may be substituted without altering the method embodied below.

Material Characterizations

The photographs and SEM images of synthesized periodate complexes and an associated electrode prepared with an iron periodate are shown in FIG. 1. Illustrated in FIG. 1 is the following FIG. 1(a) Photographs of as prepared silver and iron periodate complexes; SEM images of FIG. 1(b) iron(III) periodate complex; FIG. 1(c) iron(III) periodate electrode; FIG. 1(d) silver(I) periodate complex; FIG. 1(e) silver(I) periodate electrode; and FIG. 1(f) pure carbon nanotubes.

Unlike alkaline periodates, which readily dissolve in water, the iron(III) periodate complex was insoluble, making solid electrode fabrication possible. The freshly prepared periodate complex showed dark yellow color, which turned orange upon heating to 100° C. This was used as the active cathode material in this embodiment. Other suitable active cathode materials could be employed. Scanning electron microscopy (SEM) images showed that the prepared sample comprised sub-micron spherical particles.

Referring to FIG. 2(a), energy-dispersive X-ray spectroscopy (EDX) showed that the complex contained Fe, I and O. The iron(III) periodate complex contained 25.64% Fe and 43.65% I by mass and was determined to be $H_7Fe_4(IO_4)_3O_8$, containing both adsorbed and lattice water. Thermogravimetric Analysis (TGA, FIG. 2(e)) results were consistent with this determination; only $Fe_2O_3$ was left behind beyond 600° C. X-ray diffraction (XRD) patterns showed peaks at 20.70° (101), 36.08° (301), 53.76° (013) (ICSD 987-015-4674), but due to the sub-micron particle size, the sample was considered to be largely amorphous.

For comparison, silver(I) periodate complex was synthesized using a similar method starting with $AgNO_3$. EDX results showed that Ag and I had a molar ratio of 2:1, the rest being O. Yet TGA data indicated that only 35% of the original sample was Ag. Hence, the formula was inferred to be $H_5Ag_2IO_7 \cdot 8H_2O$ and the sample could be dehydrated under vacuum or by heating.

Furthermore, the silver salt was more susceptible to hydrolysis in neutral aqueous environment, as the sample turned black slowly when soaked in DI water. Its XRD pattern is shown in, for example, FIGS. 2 (a-e), whose peaks matched the reported structure of rhombohedral $H_3Ag_2IO_6$ (ICDD 00-058-0524): major peaks were indexed as 20.97° (003), 22.24° (012), 30.10° (110), 36.95° (113), 39.51° (015), 50.41° (205), 53.38° (103), 67.95° (107), respectively. Further, FIGS. 2(a-e) illustrate EDX of FIG. 2(a) iron(III) periodate complex; FIG. 2(b) silver(I) periodate complex; XRD of FIG. 2(c) iron(III) periodate complex; FIG. 2(d) silver(I) periodate complex; and FIG. 2(e) TGA analysis of the periodates.

The double salt sodium manganese periodate was prepared in one embodiment by titration of $MnSO_4$ into $NaIO_4$ solution, which not only provided $IO_4^-$ anions but also served as an oxidizing agent. FIGS. 3(a-e) show the characterizations of the synthesized sodium manganese periodate complex. The sample was dark red in color. According to SEM images, the sample comprised of sub-micron spherical crystals. EDX showed the presence of Na, I, Mn, and O. TGA showed that the compound was relatively stable below 250° C. The minor gradual drop was attributed to the removal of residue and crystallization water.

The XRD pattern illustrated in FIG. 3(e) for $NaMnIO_6$ showed hexagonal crystalline structures with space group P312 (ICDD 00-023-0685). Major peaks at 17.21°, 20.52°, 26.92°, 35.88°, 40.08°, 45.40°, 50.96°, 59.14°, 64.45°, 67.24° were assigned to (001), (100), (101), (110), (111), (201), (112), (211), (300) and (301), respectively. Furthermore, FIGS. 3(a-e) illustrate the following $NaMnIO_6$ nanoparticle characterization: FIG. 3(a) EDX and photograph; FIG. 3(b) & FIG. 3(c) SEM images; FIG. 3(d) TGA; FIG. 3(e) XRD pattern.

Iron(III) and Ag(I) Periodate Cells

Electrolyte Selection: In aqueous battery systems, common anode candidates include zinc, aluminium, lead, and magnesium. An active metal can provide higher potential but can also react with the acidic electrolyte to generate hydrogen. Zinc is moderately reactive, and has been extensively used in alkaline and mildly acidic systems. In one embodiment, zinc was used for the battery. It will be understood that other anodes could be employed.

As previously mentioned, the periodate cathode would be affected by the concentration of hydrogen ions and pH of the electrolyte. As shown in FIGS. 4(a-c), several electrolytes, such as strong acids and bases, phosphoric acid, acetic acid, were tested to ascertain whether such electrolytes were practical for battery fabrication.

As shown in FIG. 4(a), cells with potassium hydroxide showed relatively poor performance based on discharge voltage and discharge time. 2 M phosphoric acid cell had a relatively flat and stable discharge curve, though initially the voltage was lower than in 1 M sulfuric acid. This was attributed to the fact that the latter was a stronger acid providing higher concentration of hydrogen ions as illustrated in FIG. 4a. However, high $H^+$ concentration led to a reaction with metallic zinc and generated hydrogen. As a result, when the concentration of sulfuric acid was increased to 4 M, the cell performance dropped. The direct reaction between the electrolyte and anode not only consumed active materials but also generated hydrogen that inhibited discharge reaction and increased the pressure in a sealed battery, which is also a safety concern.

Phosphoric acid corroded the zinc anode at a lower rate than sulfuric acid. Different concentrations of phosphoric acid were tested as shown in FIG. 4(b). A higher acid concentration led to a higher discharge voltage at the beginning, which was in line with Nernst Equation. However, cells with 3 and 5 M acids experienced fast voltage drop as zinc corrosion consumed both electrolyte and anode. A lower acid concentration caused low discharge potential and cells reached cut-off voltage earlier.

Acetic acid was also tested as an electrolyte as shown in FIG. 4(c). The direct reaction between acetic acid and zinc was significantly lower than phosphoric acid, although minor hydrogen generation was still observed. Different concentrations of acetic acid were tested as shown in FIG. 4(c). 6 M acetic, which showed a longer discharge time than 2 M phosphoric acid, was selected as the electrolyte for one embodiment. While the use of 6 M acetic acid is preferable, it will be understood that other electrolytes could be employed. FIGS. 4(a-c) also illustrate the effect of electrolytes in iron(III) periodate cells. FIG. 4(a) shows strong acids and bases as electrolytes; FIG. 4(b) shows phosphoric acids as electrolyte; and FIG. 4(c) shows acetic acid as electrolytes.

Electrolyte selection appeared to be critical. The acid should not be reducing as it may react with periodate, nor should it be oxidizing to avoid dissolution of the anode. A non-volatile, weak acid was deemed to be most suitable because it slowed down anode corrosion. The acid also should have adequate aqueous solubility to maintain a low pH to provide $H^+$ for the cathode reaction. Organic acids such as benzoic acid were rejected due to low solubility. Because zinc is an active metal, even a weak acid could react with it; hence, the periodate-zinc battery using an acid electrolyte is well suited as a reserve battery for a longer storage time.

In the iron(III) periodate battery, the cathodic reaction was proposed as (1):

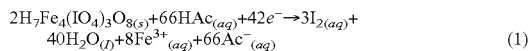
$$2H_7Fe_4(IO_4)_3O_{8(s)} + 66HAc_{(aq)} + 42e^- \rightarrow 3I_{2(aq)} + 40H_2O_{(l)} + 8Fe^{3+}_{(aq)} + 66Ac^-_{(aq)} \quad (1)$$

While the anodic reaction was (2):

$$Zn_{(s)} \rightarrow Zn^{2+}_{(aq)} + 2e^- \quad (2)$$

Starch solution was added to discharged cells and a dark blue color was observed, indicating a 7 $e^-$ process and production of $I_2$. This was different from the $IO_4^-$ to $IO_3^-$ –2 $e^-$ process in the alkaline system reported before. Other possible side reactions include the reduction of Fe (III) species.

Cathode Optimization: Because of the poor conductivity of periodates, conductive additives were employed in one embodiment. Typical battery conductive materials include graphite, carbon black, carbon cloth/foam, graphene materials, carbon nanotubes (CNTs), and the combination of them. Different carbon materials were tested as shown in FIG. 5. The sub-micron carbon particles performed better because they were easier to disperse. CNTs were found to be somewhat better than carbon black. The required amount of conductive carbon (14%) was much lower than previously reported values, such as 42.9% graphite and acetylene black, and 25% graphite.

The cations in periodates turned out to have a less significant impact on the final performance than expected. Ag(I) has been used in batteries such as AgCl—Mg and $Ag_2O$—Zn. Yet the replacement of Fe (III) by Ag(I) did not show improvement in battery performance, as shown in FIG. 5(b). This is because the silver complex had a larger particle size, leading to slower reactions and larger molar mass, and lower periodate percentage dropped the overall performance. The reaction between Ag(I) and Zn had a lower actual potential than the cut-off voltage. FIGS. 1(b-f) also showed that CNTs distributed and formed better conductive networks in iron(III) periodate complex than in silver(I) partially due to its smaller particle size and spherical shape. Taking other factors including the costs into consideration, Fe(III) was more suitable than Ag(I). FIG. 5(a) also illustrates iron(III) periodate cells with different conductive additives. FIG. 5(b) shows a comparison of cations: $Fe^{3+}$ vs $Ag^+$.

Anode: As previously mentioned, $H^+$ reacts with active metals like zinc and leads to anode corrosion. There have been various reports on the addition of inhibitor into electrolytes to slow down the process. Organic inhibitors adsorb onto the metal surface to inhibit corrosion. In this study, three organic inhibitors (at the concentration of 200 ppm) were tested, as illustrated in FIG. 6. In particular, the organic inhibitors included hydroxyethyl cellulose, methylcellulose, and hexadecylamine Hydroxyethyl cellulose has been reported to be an efficient inhibitor for zinc corrosion by suppressing the reaction with $H^+$. The discharge profile in presence of the cellulose showed higher and more stable potential. However, cells became unstable and failed after some time. It was inferred that the oxidizing property of periodate and acidic environment caused this problem by oxidation and hydrolysis of cellulose molecules. Methylcellulose and hexadecylamine also caused a drop in performance Again FIG. 6 illustrates the influence of anode corrosion inhibitors in the electrolyte.

Reserve Cells with 3D printed housing: Due to size/space limitation of Swagelok cells, only small amount of acids and electrode materials could be added. To further study the potential capacity of the iron(III) periodate complex, reserve cell prototypes that can accommodate more electrolyte and zinc anode were fabricated.

FIG. 7(a) shows an embodiment of the fabrication process of the 3D printed cells. The housing was made with acrylonitrile butadiene styrene (ABS) plastic, which is a common 3D printing material. It will be understood that other types of plastic could be used to manufacture the housing. The cathode was prepared and inserted into the electrode slots. The zinc foil anode was inserted before the electrolyte was injected into the housing. An optional cap was also added. The housing could be designed as a single-cell battery or a double-cell (or multi-cell) battery with different dimensions.

FIG. 7(b) and Table 1 show the performance of single reserve battery cells in 3D printed housings. As discharge rate increased, the cell capacity increased. This was due to the competition between the discharge and the hydrogen generation reaction. The corrosion rate of zinc was mostly constant at a given acid concentration while a higher discharge rate promoted the discharge reaction.

Another possible undesired side reaction was the slow migration of cathode species (like $Fe^{3+}$) into electrolyte that reacted with the anode. Generally, the iron(III) periodate complex showed a specific capacity between 0.28 and 0.33 Ah $g^{-1}$, which is similar to NiOOH (0.29 Ah $g^{-1}$) and $MnO_2$ (0.31 Ah $g^{-1}$), but higher than $Ag_2O$ (0.23 Ah $g^{-1}$) and AgCl (0.19 Ah $g^{-1}$). Yet at higher discharge rates, the discharge voltage dropped, leading to a lower energy output. An embodiment of a double-cell battery with a cap is shown in FIG. 7(c).

Figure 7:
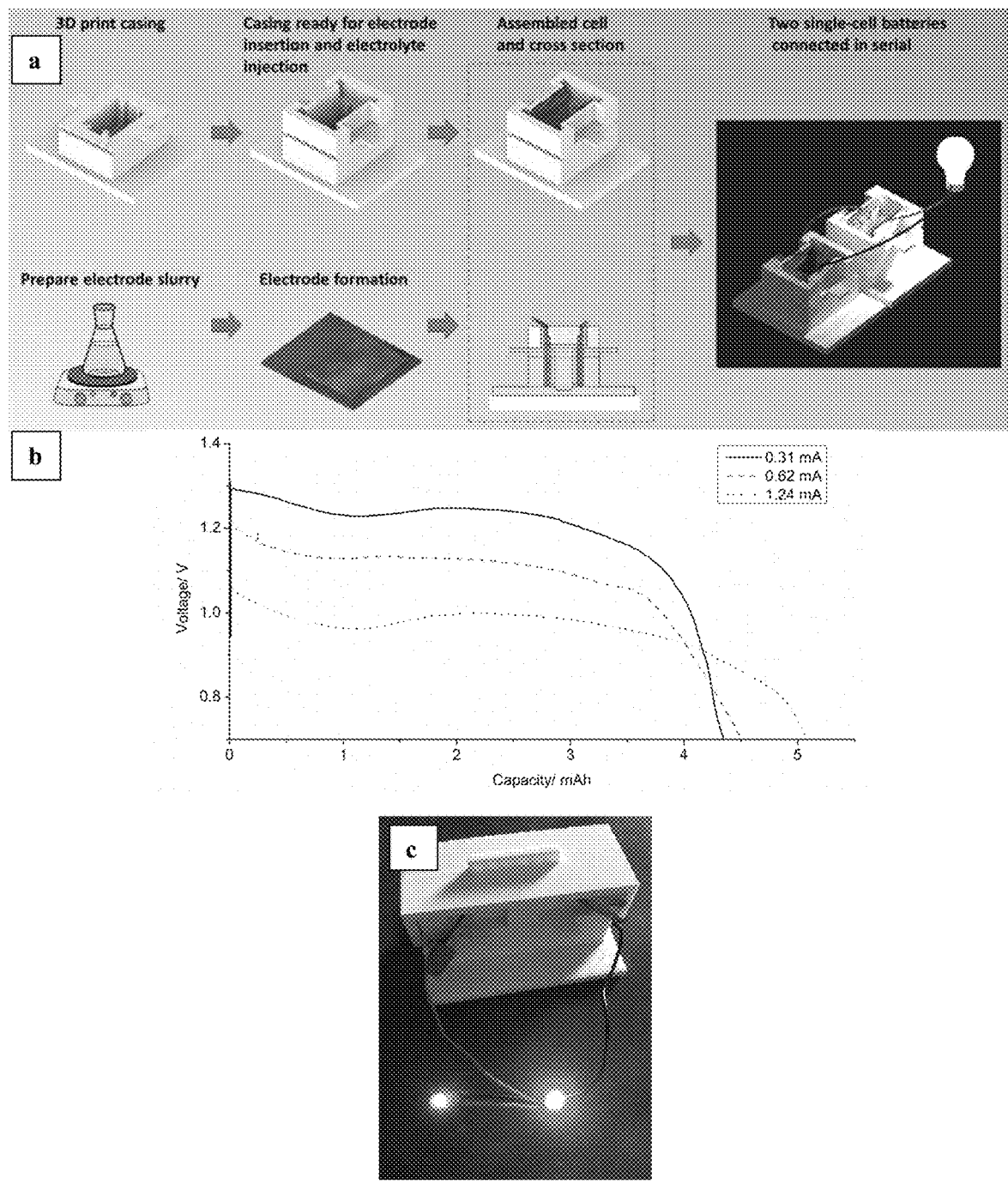
FIGS. 7(a-c) shows one embodiment of a 3D-printed $H_7Fe_4(IO_4)_3O_8$—Zn reserve battery: (a) steps in the fabrication of the reserve battery; (b) batteries discharged under different current; (c) a demonstration of a 3D-printed double-cell battery powering LED lights.

In summary FIGS. 7(a-c) show a 3D-printed iron(III) periodate reserve battery. FIG. 7(a) illustrates an example of a fabrication process. FIG. 7(b) shows batteries discharged under different current. FIG. 7(c) is a demonstration of a 3D-printed double-cell battery powering LED light.

Double Salt Periodate: Sodium Manganese Periodate Cells

Figure 8:
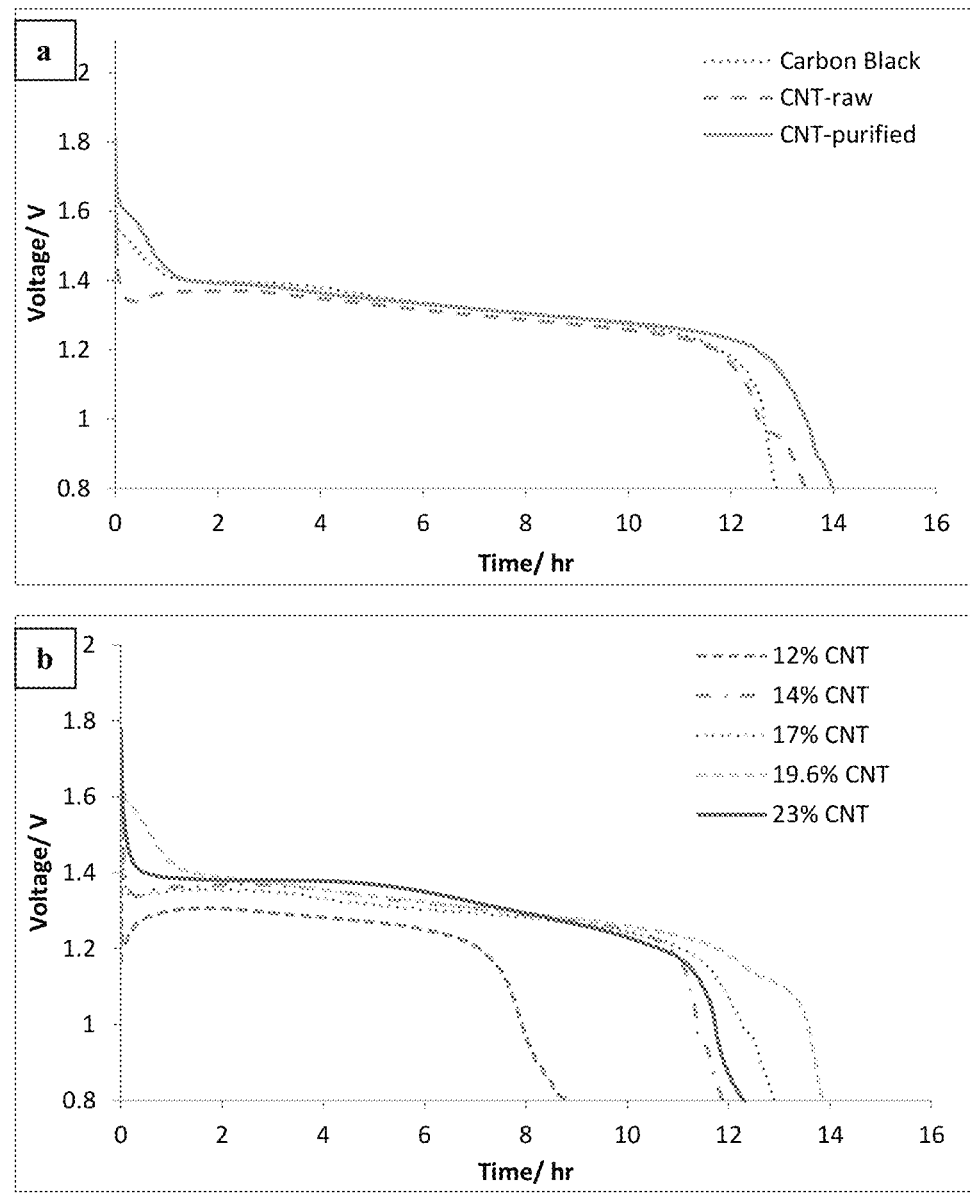
FIG. 8(a) is a graph illustrating the effect of different carbon materials in $NaMnIO_6$—Zn cells.
FIG. 8(b) is a graph showing the effect of different amount of carbon materials in $NaMnIO_6$—Zn cells.

FIGS. 8(a-b) show the cathode formulation optimization regarding conductive additives for double salt $NaMnIO_6$ batteries. Purified CNTs turned out to be a better option, with impurities like metal oxides, which might enhance side reactions, removed. More carbons enhanced electrode conductivity but took the limited space in electrodes.

Hence, it was necessary to optimize the amount of conductive additives. 19.6% purified CNTs turned out to an optimum amount. In one embodiment, a typical optimized $NaMnIO_6$ electrode contained 19.6% purified carbon nanotubes (CNT), 6% polyvinylpyrrolidone (PVP), and 74.4% $NaMnIO_6$.

Again, FIGS. 8(a-b) illustrate conductive additive for sodium manganese periodate complex battery. FIG. 8(a) illustrates different carbon conductive additives. FIG. 8(b) shows an amount of conductive additive purified CNTs and related voltage over time.

HAc electrolyte and dual-electrolyte systems: $NaMnIO_6$—Zn ells were fabricated in 3D-printed battery casings using HAc electrolyte as shown in FIG. 9(a).

A discharge plateau was observed around 1.3 V with the following proposed reaction: $2NaMnIO_{6(s)} + 9Zn_{(s)} + 24CH_3COOH_{(aq)} \rightarrow 2CH_3COONa_{(aq)} + 2Mn(CH_3COO)_{2(aq)} + 12H_2O_{(l)} + I_{2(aq)} + 9Zn(CH_3COO)_{2(aq)}$ When discharged at 0.3 mA, the battery showed a capacity of 7.24 mAh (608.2 mA $g^{-1}$ $NaMnIO_6$). Yet at 0.2 mA, discharge voltage dropped fast after 22 hrs and finally failed when zinc anode was exhausted. The capacity of HAc cells was dependent on discharge rates: faster discharge delivered larger capacity before electrolyte and anode were consumed by side reactions.

The HAc electrolyte led to anode corrosion, which significantly limited the performance under low discharge rate. Alternatively, the present inventors developed a dual-electrolyte system composed of an acidic electrolyte (HCl) at cathode and a neutral electrolyte (NaCl) at anode. The resulted batteries showed much higher discharge plateau compared to HAc, providing higher output power as illustrated in FIG. 9(b). Furthermore, even for low-rate discharge, the batteries avoided failing due to zinc depletion. The batteries showed capacities at around 9 mAh (equivalent to 750 mAh g$^{-1}$ NaMnIO$_6$), nearly 94% of the theoretical capacity. The present inventors observed that faster discharges delivered more capacity. Since acid and anode were not limiting reagents, a possible explanation was a slow redox reaction between I(VII) and Cl$^-$.

The mechanism of one embodiment of such a dual-electrolyte battery is shown in FIG. 9(c). The anion exchange membrane blocked the migration of H$^+$ inhibiting reaction between zinc and the acid. Anions can move freely, completing the circuit. The chemical reaction is shown below:

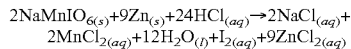

$$2NaMnIO_{6(s)} + 9Zn_{(s)} + 24HCl_{(aq)} \rightarrow 2NaCl_{(aq)} + 2MnCl_{2(aq)} + 12H_2O_{(l)} + I_{2(aq)} + 9ZnCl_{2(aq)}$$

Figure 9:
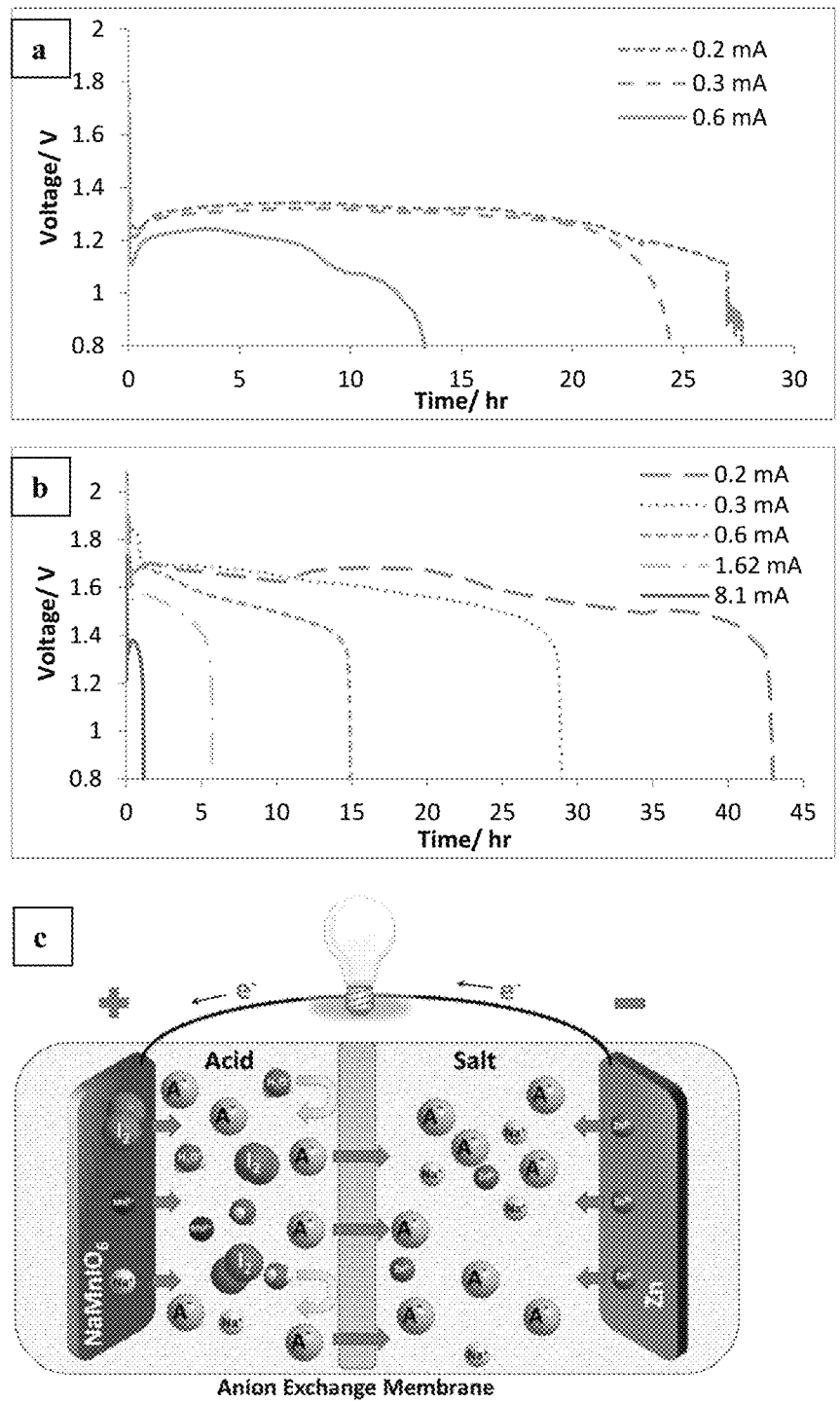
FIG. 9(a) is a graph showing double salt periodate $NaMnIO_6$—Zn cells using HAc single electrolyte discharged under different rates.
FIG. 9(b) is a graph showing double salt periodate $NaMnIO_6$—Zn cells using HCl—NaCl dual-electrolytes.
FIG. 9(c) demonstrates a mechanism of a dual-electrolyte battery design.
Figure 10:
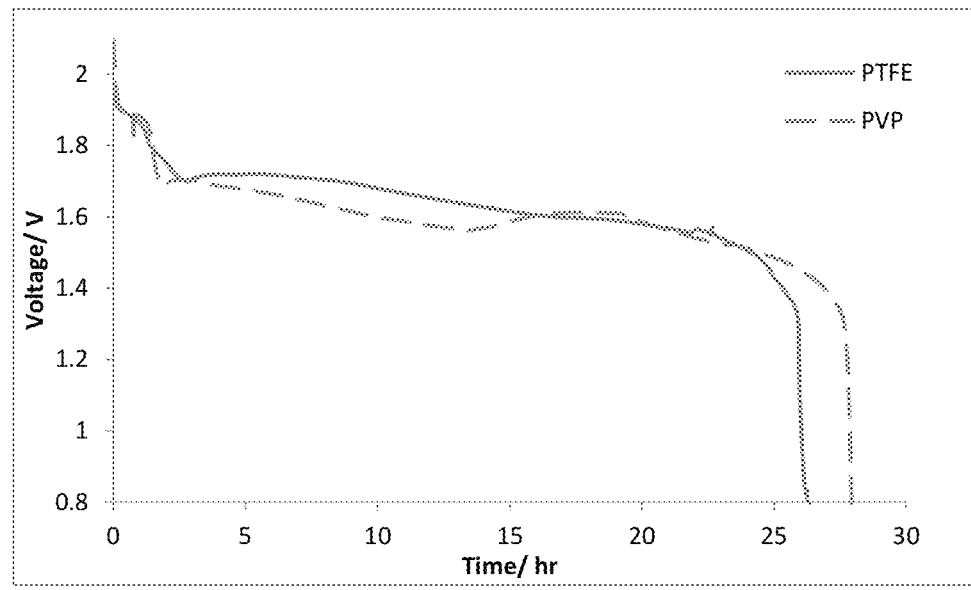
FIG. 10 is a graph comparing different cathode binders: PVP vs PTFE.

It should be noted that monoprotic strong acids are preferred in such dual-electrolyte systems, for acid molecules and anions like HSO$_4^-$ may pass through the membrane and release H$^+$. Higher acid concentration led to a higher output voltage but lower capacity due to side reactions. Again, FIGS. 9(a-c) illustrate an example of NaMnIO$_6$—Zn batteries in 3D-printed casings. FIG. 9(a) shows a HAc electrolyte. FIG. 9(b) illustrates HCl—NaCl dual-electrolyte. FIG. 9(c) shows an exemplarily mechanism of dual-electrolyte systems. Different polymers were tested as additives in cathode, and PVP was found to be a better choice compared with others as shown in FIG. 10. Shown in FIG. 10 is a graph showing NaMnIO$_6$ dual-electrolyte cells with different cathode binders discharged at 0.3 mA.

Figure 11:
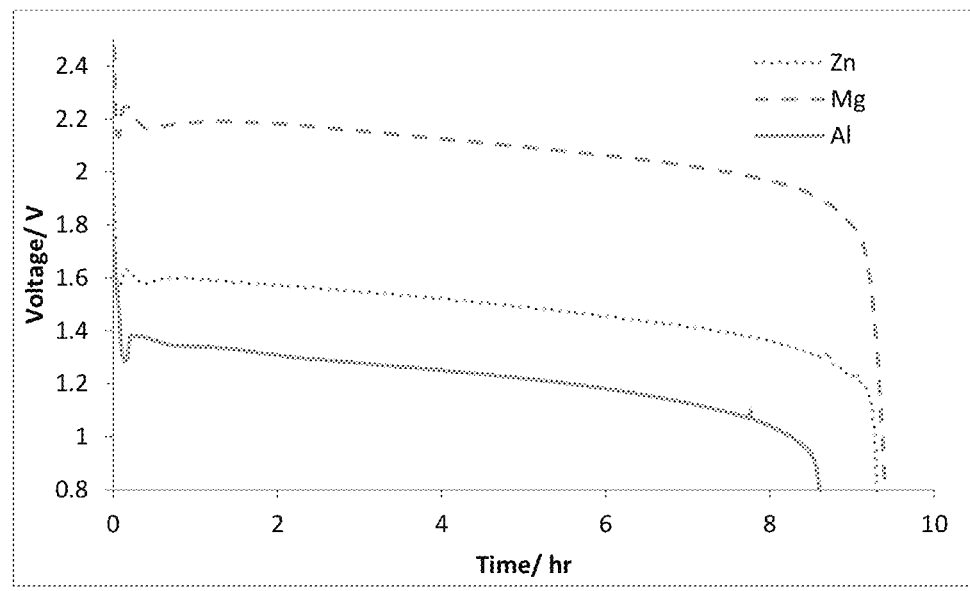
FIG. 11 is a graph comparing different metal anodes for $NaMnIO_6$ dual-electrolyte batteries.

Anode selection: Cells containing stoichiometric quantities of anode metals namely Zn, Al, Mg (0.04 g cathode; 0.066 g Zn, 0.02 g Al, 0.0325 g Mg, FIG. 11 were fabricated. In FIG. 11 is a graph showing NaMnIO$_6$ dual-electrolyte cells with different metal anodes discharged at 0.1 C.

NaMnIO$_6$ showed the highest specific capacity of around 750 mAh g$^{-1}$. The discharge voltage dropped when the anode was no longer in significant excess. Specific capacity also dropped under high discharge rates, which was attributed to the limited anode surface area. Passivation layer on Al surface was hard to dissolve in neutral electrolyte, which significantly dropped the output potential. However, due to the higher specific capacity and low density, Al cells showed higher specific energy. Mg brought the highest output voltage and hence specific energy of 740 Wh kg$^{-1}$. However, the self-corrosion was significant, especially under high rates. In corrosive NaCl solution, all above metals were subject to corrosion, generating hydrogen and OH$^-$. Yet this was more critical in Mg cells, for bubbles were generated during discharge, higher anode current enhanced corrosion. Table 2 in FIG. 14(b) shows the rate performance of the NaMnIO$_6$ cells with stoichiometric quantities of electrodes. For FIGS. 14(a-b), in FIG. 14(a) illustrated is Table 1, showing the performance of the 3D-printed H$_7$Fe$_4$(IO$_4$)$_3$O$_8$—Zn reserve battery. In FIG. 14(b) Table 2 illustrates the rate properties of NaMnIO$_6$ batteries using various metal anodes.

In one embodiment, iron(III) periodate complex was prepared by precipitation reaction of Fe(NO$_3$)$_3$ and NaIO$_4$ and used for the first time in battery applications. The complex used as a cathode using acid electrolytes and a zinc anode. A novel 3D-printed reserve battery design comprising of replaceable electrodes was also developed. The iron (III) periodate complex, H$_7$Fe$_4$(IO$_4$)$_3$O$_8$, showed a high specific capacity of 300 mAh g$^{-1}$ demonstrating that solid form periodate compounds are promising cathode materials. With an improved dual-electrolyte design, sodium manganese periodate (NaMnIO$_6$) showed an even higher specific capacity of 750 mAh g$^{-1}$. Particle size, anode selection, electrolyte concentration, and the pKa of the acid electrolyte are all important factors. It will be understood that other types of electrochemical cells can also be developed based on the periodate compounds presented herein.

Figure 12:
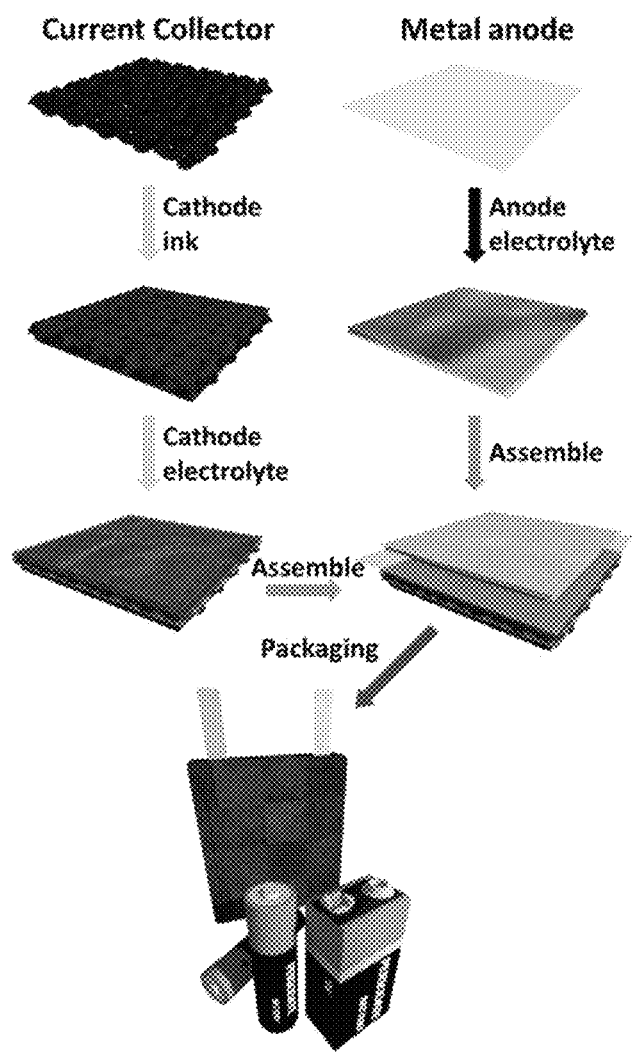
FIG. 12 is the fabrication process of periodate dry cells.

A dry cell contains immobilized electrolyte(s) and hence can work without spilling. The sodium manganese periodate battery was also fabricated in dry cell form using polymers to serve solid electrolyte eliminating the need for free-flowing liquids. The fabrication process is shown in FIG. 12. This allowed the production of dry cells without acid/water injection for activation. While we made dry cells in pouch battery form, periodate batteries in other forms like cylindrical and button batteries can also be fabricated in similar ways. FIG. 12 illustrates an exemplary fabrication process of a periodate dry cell.

Due to lower ionic mobility in polymers, the capacity and voltage decreased somewhat compared to liquid electrolytes, though. FIGS. 13(a-b) shows the pictures of such dry cells and a discharge curve under 0.05 C. FIG. 13(a) is a demonstration of NaMnIO$_6$ dry cells powering LED light. FIG. 13(b) is a graph that illustrates discharge curve of a NaMnIO$_6$ dry cell under the rate of 0.05 C. Shown in FIG. 13(a) is a periodate battery 130. The battery 130 has a casing 131 with optional polymer electrolyte 132. Terminals 135 and 134 are connected to electrodes (cathodes and anodes) 136 and 137 as previously described. Clip 133 provides support to the metal 134 and electrode 136 (zinc metal, on the backside) in this example.

Experimental Section

In one embodiment, the iron(III) periodate composites were prepared via a stoichiometric reaction between Fe(NO$_3$)$_3$ and NaIO$_4$ solution, which was previously adjusted to the pH of 1 and with a small amount of polyvinylpyrrolidone (PVP) added. The solution was further stirred and filtrated, washed with dilute HNO$_3$ and dried under vacuum. For comparison, silver(I) periodate complex was also prepared by replacing Fe(NO$_3$)$_3$ with AgNO$_3$. Scanning electron microscope (SEM) with Energy-dispersive X-ray spectroscopy (EDX), Thermogravimetric Analysis (TGA), Brunauer, Emmett and Teller (BET) and X-ray Diffraction (XRD) were used to characterize the synthesized material.

Electrodes were made in one embodiment as follows: The dry powdered materials were mixed in DI water. Then electrode slurry was pasted onto a stainless steel current collector and dried. Optimization was carried out in Swagelok-type cells using stainless steel current collectors. Assembly was made with a hydrophilic polytetrafluoroethylene (PTFE) and a glass fiber separator between electrodes. A typical cathode formulation was composed of periodate salt, conductive carbon additive, and PVP. Different conductive carbon additives were tested. Multiwalled carbon nanotubes (CNTs), synthetic graphite, graphitized carbon black, and activated charcoal were tried as conductive additives. The amount of materials was also varied. Other optimization measures were carried on, such as: different electrolyte acids including HAc, HCl, $H_2SO_4$, $H_3PO_4$ as well as polymer cathode additives like PTFE and PVP. Anodes were mostly metal foils or meshes.

The casing of the prototype reserve battery was printed using ABS plastic. It can also be printed using other compatible polymers like polylactic acid (PLA). Electrodes containing powders were laminated with a hydrophilic layer made of polytetrafluoroethylene (PTFE), polyvinylidene difluoride (PVDF), or polyethylene membrane for fortification purpose. Electrode plates were inserted into the slots before an electrolyte was injected into the cell. The electrochemical performance of the cells was measured using an MTI Battery Analyzer using constant resistance or constant current methods.

In case of dry cells, cathodes containing solid periodate particles, conductive carbon and PVP were pasted onto inert current collectors such as conductive carbon fabrics. Polymer, acid (cathode) or salt (anode), and water were mixed to form homogenous solutions. The electrode was then dried to remove water, before the cathode electrolyte was cast and dried for some time to form a layer. Similarly, anode electrolyte was applied onto zinc mesh and then partially dried. The cell was then thermally packaged in plastic packaging, with the anion-exchange-membrane separator cut and placed between electrodes. The fabrication process is shown, for example, in FIG. 12. Other fabrications may be available depending on the implementation and purpose of the battery.

The headings and sub-headings utilized in this description are not meant to limit the embodiments described thereunder. Features of various embodiments described herein may be utilized with other embodiments even if not described under a specific heading for that embodiment.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. An inorganic battery comprising,
a high-oxidation-state material cathode;
a reducing anode, and wherein the cathode and the anode both form electrodes;
one or more acid or neutral electrolytes that are a chemical medium forming an acid or neutral electrolyte solution that separate the electrodes and allows ion movement between the electrodes;
wherein the high oxidation-state-material cathode contains one or more high oxidation state elements with oxidization states of five or higher to form high-oxidation-state material that remains insoluble in the acid or neutral electrolyte solution; and
wherein the high-oxidation-state-material cathode is a periodate cathode containing more than one metal or hydrogen.

2. The battery of claim 1, further including an anion-exchange-membrane in a center of a battery casing to separate the cathode and the anode electrodes, and a dual-electrolyte design for electrolyte separation and pH control.

3. The battery of claim 1, wherein the periodate cathode further includes an iron(III) periodate.

4. The battery of claim 1, wherein the periodate cathode further includes a silver (Ag) periodate.

5. The battery of claim 1, wherein the periodate cathode is a double salt periodate cathode containing a plurality of metals and hydrogen, wherein the plurality of metals take part in an electrochemical process of the battery, and the periodate cathode is $H_7Fe_4(IO_4)_3O_8$.

6. The battery of claim 1, wherein the periodate cathode is a double salt periodate cathode, and the double salt periodate cathode is a sodium manganese periodate cathode, and further the periodate cathode is $NaMnIO_6$.

7. The battery of claim 1, wherein the one or more electrolytes is an aqueous non-flammable non-alkaline electrolyte.

8. The battery of claim 1, wherein the one or more electrolytes is an ionic liquid non-flammable electrolyte.

9. The battery of claim 1, wherein the battery casing is 3D printed using a polymer or a metal filament to form desired conformal shapes and sizes.

10. The battery of claim 1, wherein the high-oxidation-state-material also includes a material selected from a group consisting of an iodate, a bromate, a perbromate, a permanganate, a manganate, a chromate, a tungstate, a dichromate, and any combination thereof.

11. The battery of claim 10, wherein the high-oxidation-state-material has a non-acid-ion metal element that is selected from a group consisting of a nickel, a vanadium, a lead, a copper, a cobalt, a bismuth, an antimony, a tin, a titanium, a mercury, a barium, a chromium, and any combination thereof.

12. The battery of claim 1, wherein the high-oxidation-state-material cathode further includes a plurality of conductive carbon nanotubes, and a hydrophilic layer of polymer enhancement.

13. The battery of claim 1, wherein the reducing anode is an active metal anode.

14. The battery of claim 1, wherein the electrolyte is a gel, a polymer electrolyte, or a mixture; and the chemical medium is a non-liquid and the battery is a dry cell battery containing no free-flow liquid.

15. The battery of claim 14, wherein the electrolyte for the cathode is an acidic electrolyte, and the electrolyte for the anode is a salt or an electrolyte having a pH of 7.

16. The battery of claim 1, wherein the high-oxidation-state-material cathode is a solid electrode and the one or more high oxidation state elements takes part in a chemical redox reaction.

17. An inorganic battery comprising,
a high-oxidation-state material cathode;
a reducing anode, and wherein the cathode and the anode both form electrodes;
one or more electrolytes that are a chemical medium forming an electrolyte solution that separate the electrodes and allows ion movement between the electrodes;
wherein the high oxidation-state-material cathode contains one or more high oxidation state elements with oxidization states of five or higher to form high-oxidation-state material that remains insoluble in the electrolyte solution;

wherein the high-oxidation-state-material cathode is a periodate cathode containing more than one metal or hydrogen; and wherein the chemical medium is a non-liquid and the battery is a dry cell battery containing no free-flow fluid.

18. The method of claim 17, wherein the inserting and securing the cathode assembly and the anode into the casing further includes inserting and securing the cathode assembly and the anode into a 3D-printed casing, wherein the 3D-printed casing is reusable and the cathode assembly and the anode are replaceable when consumed.

19. A method of making a high oxidation state periodate battery, comprising:

(a) dissolving a cathode electrolyte compound and an anode electrolyte compound in water, respectively to form two electrolyte solutions;

(b) mixing a cathode slurry containing a plurality of solid cathode particles including a periodate, a conductive carbon, a binder, and an amount of water;

(c) casting the cathode slurry onto an inert current collector, drying the cathode slurry before laminating a polymer fortification layer to form a cathode assembly;

(d) placing an anion-exchange-membrane in a center of a battery casing to separate the cathode assembly and the anode electrodes, and sealing sides of the battery casing with a sealant to prevent ion by-passing;

(e) inserting and securing the cathode assembly and the anode into the battery casing; and (f) activating the battery by injecting the electrolyte solutions before capping the battery casing for sealing.

* * * * *